Nov. 23, 1948.   W. A. HYLAND   2,454,701
LEVER
Filed Dec. 13, 1945
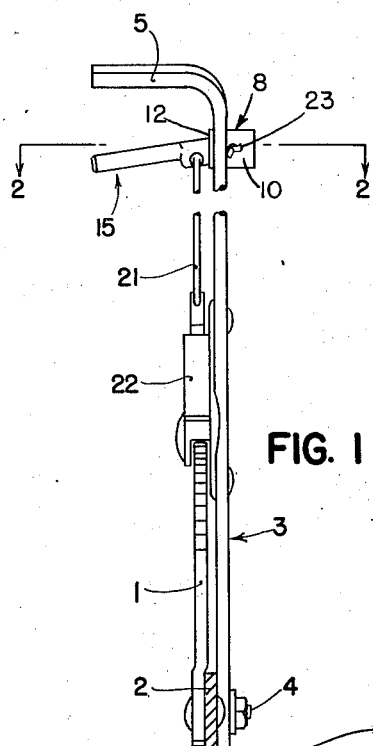
FIG. 1
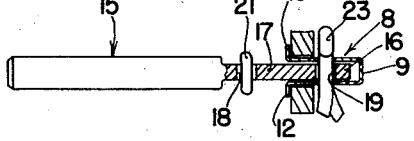
FIG. 2
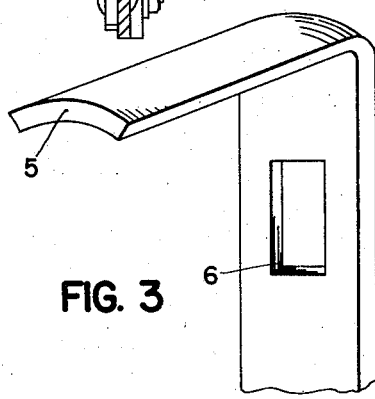
FIG. 3
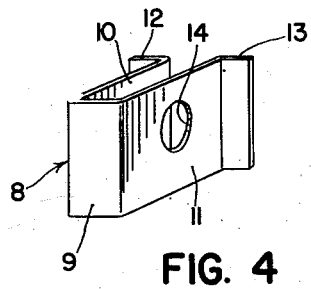
FIG. 4
INVENTOR.
WILLIAM A. HYLAND
ATTORNEYS.

Patented Nov. 23, 1948

2,454,701

UNITED STATES PATENT OFFICE 2,454,701

LEVER

William A. Hyland, Horicon, Wis., assignor to John Deere Van Brunt Company, a corporation of Wisconsin Application December 13, 1945, Serial No. 634,815

6 Claims. (Cl. 74—523)

The present invention relates generally to agricultural implements and more particularly to hand levers commonly employed, for various purposes, on agricultural implements as well as other kinds of devices and machinery.

The object and general nature of the present invention is the provision of a hand lever having or associated with detent and ratchet mechanism for holding the lever in different positions of adjustment, and more particularly it is a feature of this invention to provide an improved hand grip mechanism for operating the detent means. Specifically, it is an important feature of this invention to provide novel and extremely simple and inexpensive means for pivoting the hand grip for the detent to the lever handle. Further, it is a feature of this invention to provide hand grip means which can easily and quickly be assembled and held in place by only one part, which part preferably also forms a pivot connection between the hand grip and the lever handle.

These and other objects of the present invention will be apparent to those skilled in the art after a consideration of the following detailed description, taken in conjunction with the accompanying drawings.

In the drawings:

Figure 1 is a side elevation of the hand lever and associated parts.

Figure 2 is a sectional view taken generally along the line 2—2 of Figure 1.

Figures 3 and 4 are fragmentary perspective views showing, respectively, the upper end of the lever handle and the attachment clip for the hand grip.

Referring now to the drawings, in order best to illustrate the principles of the present invention I have shown a notched sector 1 mounted on a support 2 on which a lever handle 3 is pivoted, as at 4. The support 2 may be the frame or other part of an agricultural implement or other machine. The free or upper end of the lever handle is bent laterally, as at 5, to form a grip, and just below the grip 5 a substantially rectangular opening 6 is formed, as by a punching operation. An attachment clip 8 is formed as best shown in Figure 4, being in the shape of a U-shaped member formed of flat strap stock or the like and having a U-shaped intermediate portion 9, side sections 10 and 11, and laterally outwardly directed flanges 12 and 13. The side sections 10 and 11 are apertured, as at 14. A movable hand grip 15 is formed preferably of round stock and has one end 16 flattened, as at 17, and provided with a pair of apertures 18 and 19. The aperture 18 receives the upper end of a link 21 that extends downwardly to detent mechanism 22, of conventional construction so far as the present invention is concerned, and the other aperture 19 is adapted to receive a cotter key 23 or other suitable pin, which preferably is in the nature of a quick detachable member.

From Figure 2 it will be observed that the openings 14 through which the cotter key 23 is adapted to extend are disposed from the flanges 12 and 13 a distance substantially equal to the thickness of the lever handle 3. It will thus be seen that the assembly of the hand grip 15 and its attachment to the lever proper is a simple matter and may easily and quickly be accomplished, merely by inserting the central portion of the attachment clip through the opening 6 in the lever, and then bringing the hand grip 15 into position to permit the insertion of the cotter key 23 through the openings 14 in the attachment clip and the opening 19 in the hand grip 15. With this one operation the hand grip 15 is both pivoted to the hand lever and at the same time the attachment clip 8 is connected in position and held in position in the lever opening 6 receiving it. It will be seen, particularly from Figure 2, that with the attachment clip 8 and the pivotal member 23 holding it in position and also forming the pivot of the hand grip 15, there is no possible lateral displacement of the hand grip 15 yet with the quick detachable member 23 the parts may be readily assembled and held in assembled relation. Also, by removing the single member 23, the associated parts may be disconnected as for repair and/or replacement and the like. The opening 6 may be formed on standard punches without special equipment, and likewise the attachment clip 8 may be formed on standard bending machines without special equipment, and therefore the manufacture and fabrication of a hand lever embodying the principles of the present invention may be performed at very low cost, and likewise the cost of assembling the hand lever is quite low, particularly as compared with other hand levers where special machinery and/or operations may be required.

While I have shown and described above the preferred structure in which the principles of the present invention may be incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A lever comprising a lever handle having an opening therethrough, a generally U-shaped attachment clip disposed in said opening and having shouldered portions disposed at one side of said lever handle, a hand grip extending through said opening and between the sides of said U-shaped member, and a pivot member connecting the hand grip to the U-shaped member and disposed adjacent the other side of said lever handle for holding the grip and U-shaped member in position on the lever handle.

2. A lever comprising a member having an opening therethrough, an attachment part comprising a unitary generally U-shaped member insertable in said opening and having laterally spaced apart side sections, the ends of which are bent laterally outwardly, forming shoulders that are adapted to be disposed, when said attachment part is placed in said opening, against one side of said lever member, said attachment member being apertured at points spaced from said laterally outwardly directing sections a distance substantially equal to the thickness of said lever member whereby said apertures are disposed closely adjacent the other side of said lever member when said attachment member is in place on said lever member, and a pivot member disposed in said apertures and lying substantially against the other side of said lever member for maintaining said attachment part in position thereon.

3. A lever comprising a member having a grip section and an opening adjacent thereto, an attachment part comprising a unitary generally U-shaped member insertable in said opening and having a pair of shoulders engageable with said lever member at one side thereof, said attachment part being apertured and the apertures being disposed adjacent the other side of said lever member when said attachment member is in place on said lever member, a pivot member extending through said apertures and engageable with said other side of said lever member so as to hold said attachment member in position on the lever member, and a hand grip having one end disposed between the sides of said attachment member and pivoted on said pivot member.

4. In a lever construction, a hand grip mounting for a lever member having an opening therethrough, comprising a U-shaped clip formed of generally rectangular strap stock shaped to form having side portions, the edges of which lie in parallel planes and the outer ends of which are bent laterally outwardly to serve as stops engageable with one side of said lever member when said clip is mounted on the lever member, said clip having pin-receiving apertures adapted to be disposed adjacent the other side of said lever member, the portions of said apertures adjacent said bent ends being spaced from the latter so as to lie substantially tangent to said other side of said lever member when the clip is mounted in said opening in said lever member.

5. In a lever construction, a hand grip assembly adapted to be mounted on a lever member having an opening therethrough, comprising a generally U-shaped clip having sections which are apertured near one end of the clip, the other end of the clip having the side sections thereof formed with laterally outwardly extending shoulders adapted to engage one side of the lever member when the clip is mounted in position on the lever member, said openings being spaced from said shoulders a distance substantially equal to the thickness of the portion of said lever member having the opening, a hand grip having an apertured end disposed between said side sections of the clip, and a pivot member extending through the openings in said side sections and the opening in said hand grip, said pivot member extending laterally outwardly beyond the side sections of said clip so as to engage the other side of said lever member and serving the dual purpose of forming the pivotal support for the hand grip on the attachment clip and holding the latter and the hand grip in position on the lever member.

6. A lever comprising a member having an opening therethrough, a hand grip mounting including a pair of spaced apart sections each having a laterally outwardly bent end adapted to engage one side of said lever, when said sections are disposed in said opening, and an aperture spaced from said bent end a distance substantially equal to the thickness of the apertured portion of said lever member, a hand grip disposed between said mounting sections and having an apertured portion aligned with the apertures in said mounting sections, and a pivot member extending through said aligned apertures and extending laterally beyond said mounting sections and engageable with the other side of said lever member so as to cooperate with said bent ends for holding said hand grip mounting in position on said lever member.

WILLIAM A. HYLAND.

REFERENCES CITED

The following references are of record in the file of this patent:

UNITED STATES PATENTS

| Number | Name | Date |
|---|---|---|
| 1,014,310 | Landine | Jan. 9, 1912 |
| 1,243,240 | Allen | Oct. 16, 1917 |
| 1,313,253 | Brown et al. | Aug. 19, 1919 |
| 1,428,988 | Seaholm | Sept. 12, 1922 |

Certificate of Correction

Patent No. 2,454,701.  November 23, 1948.

WILLIAM A. HYLAND

It is hereby certified that error appears in the printed specification of the above numbered patent requiring correction as follows:

Column 3, line 53, claim 4, strike out the word "having";

and that the said Letters Patent should be read with this correction therein that the same may conform to the record of the case in the Patent Office.

Signed and sealed this 29th day of March, A. D. 1949.

[SEAL]

THOMAS F. MURPHY,
*Assistant Commissioner of Patents.*